United States Patent [19]

Disimone

[11] Patent Number: 4,976,603
[45] Date of Patent: Dec. 11, 1990

[54] PIVOTING WORKPIECE REMOVAL DEVICE

[75] Inventor: John Disimone, Woodbridge, Canada

[73] Assignee: Husky Injection Molding Systems, Ltd., Bolton Ontario, Canada

[21] Appl. No.: 353,243

[22] Filed: May 17, 1989

[51] Int. Cl.[5] .............................................. B29C 45/00
[52] U.S. Cl. ..................................... 425/556; 425/588; 425/DIG. 60
[58] Field of Search ............... 425/165, 234, 236, 351, 425/403.1, 422, 437, 444, 537, 556, 572, 588, DIG. 60

[56] References Cited

U.S. PATENT DOCUMENTS

| | | | |
|---|---|---|---|
| 3,408,689 | 11/1968 | Heiner | 425/556 |
| 3,454,991 | 7/1969 | Rees | 425/169 |
| 3,700,375 | 10/1972 | Rees | 425/422 |
| 3,729,113 | 4/1973 | Rees | 414/739 |
| 3,734,666 | 5/1973 | Guest et al. | 425/437 |
| 3,767,342 | 10/1973 | Potter et al. | 425/437 |
| 3,773,457 | 11/1973 | Badoux et al. | 425/437 |
| 3,784,261 | 1/1974 | Potter et al. | 425/437 |
| 3,804,568 | 4/1974 | Rees | 425/139 |
| 3,910,740 | 10/1975 | Rees | 425/556 |
| 4,157,888 | 6/1979 | Sikorski | 425/556 |
| 4,204,824 | 5/1980 | Paradis | 425/436 R |
| 4,212,622 | 7/1980 | Kikuchi et al. | 425/444 |
| 4,368,018 | 1/1983 | Rees et al. | 425/165 |
| 4,449,914 | 5/1984 | Schmidts et al. | 425/556 |
| 4,571,320 | 2/1986 | Walker | 425/437 |
| 4,589,840 | 5/1986 | Schad | 425/556 |
| 4,732,557 | 3/1988 | Aoki | 425/537 |
| 4,752,206 | 6/1988 | Nowicki et al. | 425/537 |
| 4,795,124 | 1/1989 | Nagai | 425/556 |
| 4,834,643 | 5/1989 | Klinedinst et al. | 425/537 |

FOREIGN PATENT DOCUMENTS 50-28106 9/1975 Japan .................................. 425/437

Primary Examiner—Jay H. Woo
Assistant Examiner—C. Scott Bushey
Attorney, Agent, or Firm—Bachman & LaPointe

[57] ABSTRACT

The present invention relates to a device for removing workpieces from a wide variety of injection molding machines, particularly stack mold machines. The device includes at least one suction cup for grasping and rotating each workpiece through an approximate 90° arc from a position intermediate the mold portions to a position outboard of the mold portions. The suction cup(s) are mounted to a rotatable shaft which is actuated by a cam-operated linkage assembly.

18 Claims, 6 Drawing Sheets

PIVOTING WORKPIECE REMOVAL DEVICE

BACKGROUND OF THE INVENTION

The present invention relates to injection-molding machines and in particular to the automatic removal of injection-molded workpieces from multicavity molds.

In many injection molding machines, articles molded in an injection cycle are discharged from the movable mold portion as it approaches its withdrawn position, generally with the aid of one or more ejector rods or pins which enter each cavity of the receding mold portion and dislodge the respective workpiece therefrom. The workpiece then falls between the mold portions into a suitable receptacle disposed underneath. With molding machines operating at ever-increasing speeds, such injection systems are no longer satisfactory because the discharged workpiece may not drop rapidly enough to clear the path of the reciprocating mold portion.

Numerous attempt have been made to provide a device for rapidly removing workpieces from the mold during the operating cycle. U.S. Pat. No. 3,454,991 to Rees shows an expandable device attached to a cam operated arm which unloads a container shaped part from its mold cavity. The arm is moved by the action of the mold clamping mechanism so that no cycle time is lost. A second embodiment in this patent shows a cam operated arm extending between the mold halves. The arm carries a recessed cup in which the ejected part is carried. U.S. Pat. No. 3,700,375 to Rees shows a vacuum suction head mounted on a cam operated arm for removing a workpiece.

U.S. Pat. Nos. 3,729,103 and 3,804,568, both to Rees, show a two stage approach where a cam operated takeoff plate enters the mold area from above and picks up parts from several mold cavities. Thereafter, it moves to an outboard position where the parts are transferred to a second handling device which is cantilevered on a transverse shaft at the top of a column rotatable through 180°.

U.S. Pat. No. 4,204,824 to Paradis exemplifies another device for facilitating the removal of molded structures from mold cavities at the end of each molding cycle. The removal mechanism comprises a rack and pinion driven arm whose movement is coordinated with the opening and closing of the molding machine. The removal member is slidable or rollable on a header or mount which is in turn slidable or rollable with respect to a transverse rack.

U.S. Pat. No. 4,212,622 to Kikuchi et al shows a floor mounted robot having an extensible arm for reaching into an open mold and removing the part. The arm is controlled by a cam-operated four-arm linkage assembly. U.S. Pat. No. 4,795,124 to Nagai illustrates a pivoting tool arm for parts removal.

These devices currently have no utility in stack mold arrangements. They would be extremely cumbersome and complicated when modified for use with stack molds. Additionally, some were developed for use with the small strokes and short travel distances found on single cavity molds.

There exists a second group of devices which maintain workpiece orientation after the workpiece is removed from the mold. These devices are illustrated in U.S. Pat. Nos. 3,408,689 to Heiner, 3,910,740 to Rees, 4,157,888 to Sikorski and 4,589,840 to Schad.

The Heiner patent relates to a multi-receptacle conveyor and discharge apparatus for carrying molded parts from a mold station to a discharge station. The apparatus is characterized by an assembly comprising a plate having a plurality of openings and a relatively movable shutter underlying the plate and movable relative thereto. The shutter blocks the openings when the plate is moved toward the mold station whereby segregated parts stripped from the mold are individually received in and held segregated in the blocked openings. It moves to allow the segregated parts to drop through the openings into separate part storage containers when the plate is moved to the discharge station.

The Rees '740 and Sikorski patents both show a mold mounted guide rail system for guiding ejected workpieces away from a mold area. The rails are moved by cams activated by the clamp drive mechanism and without causing a loss of cycle time.

The Schad patent also shows a guide chute system for removing air ejected parts from a stack mold. The chutes are moved by cams actuated by the clamp drive mechanism without penalizing the cycle. The chutes carry a vacuum means for catching the ejected parts and do not require the precise ejection alignment control of the guide rails.

The guide rail approach shown in these patents works well with shallow parts such as lids which are ejected into precisely held locations. This approach however is not suitable for handling deeper air ejected parts.

Some guide chute designs suffer from two major disadvantages. First, they require considerable additional space between the mold tiebars to accommodate the chutes in the outboard position. As a consequence, a machine having a larger platen area than otherwise would be necessary must be used. Second, the air ejected parts are not always reliably captured by the vacuum system in the chutes. The ejected parts tend to drop slightly before they are caught and may consequently hang up during ejection.

Accordingly, it is an object of the present invention to provide an improved device for removing workpieces from an injection molding machine.

It is a further object of the present invention to provide a device as above which enables the space between the molding machine tiebars to be minimized for a given part height.

It is yet a further object of the present invention to provide a device having more standardized components than other devices.

It is still a further object of the present invention to provide a device as above having particular utility in stack mold machines.

These and further objects and advantages will become more apparent from the following description and drawings in which like reference numerals depict like elements.

SUMMARY OF THE INVENTION

In accordance with the present invention, a device for removing workpieces from a wide variety of injection molding machines is provided. The device broadly comprises means for removing the workpiece(s) from the molding machine during each mold cycle and for orienting each workpiece into a desired position relative to the machine for further handling. Preferably, each workpiece is moved to a position outboard of the mold components. The removing means include at least one suction cup for positively engaging and grasping each workpiece and means for rotating each suction cup between inboard and outboard positions during the molding cycle.

The removing means further includes a cam and linkage assembly for rotating each suction cup between the inboard and outboard positions in response to the opening and closing of the mold portions.

The mechanism of the present invention also includes at least one drop chute mounted to the molding machine for transporting the workpieces to a material receiving device such as a receptacle or a conveyor belt. Each chute assembly has an opening for receiving a workpiece which has been placed in an outboard position with respect to the molding machine.

Other novel features of the mechanism of the present invention will be discussed in the detailed description. While the mechanism of the present invention may be used in conjunction with a wide variety of injection molding machines, it has particular utility in stack mold machines.

BRIEF DESCRIPTION OF THE DRAWINGS

FIG. 7 is an end view of a mold cavity half and a chute assembly attached thereto of.

DETAILED DESCRIPTION OF THE INVENTION

Figure 1:
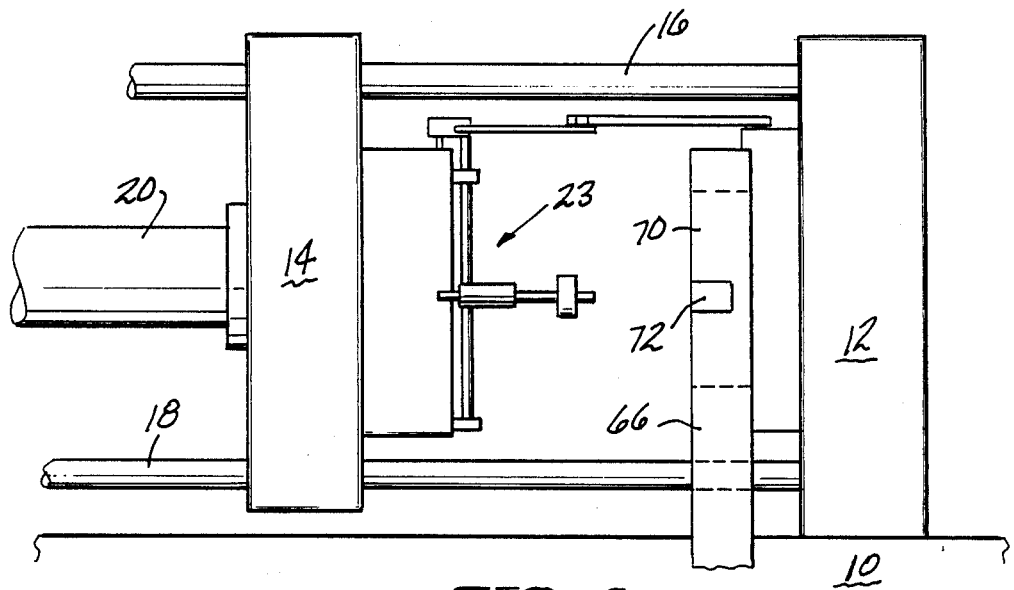
FIG. 1 is a schematic side view of an injection molding machine with the workpiece removing device of the present invention.

An injection molding machine as shown in FIG. 1 typically comprises a base 10 which contains the various motors and controls necessary for operating the principal parts of the machine, a first mold portion 12 forming a mold cavity half, and a second mold portion 14 forming a mold core half axially movable with respect to the first mold portion. The second mold portion is slidably supported on upper and lower tiebars 16 and 18. It is moved reciprocably along the tie rods by a ram 20 in a well known conventional manner. Depending upon the particular injection molding machine, the first mold portion may be stationary or it may be movable.

The injection molding machine of course is provided with suitable means for admitting masticated and liquified plastic material to the mold cavity. Such means are well known in the art and do not form part of the present invention. Therefore, they are not described in detail herein or shown in the drawings.

Figure 6:
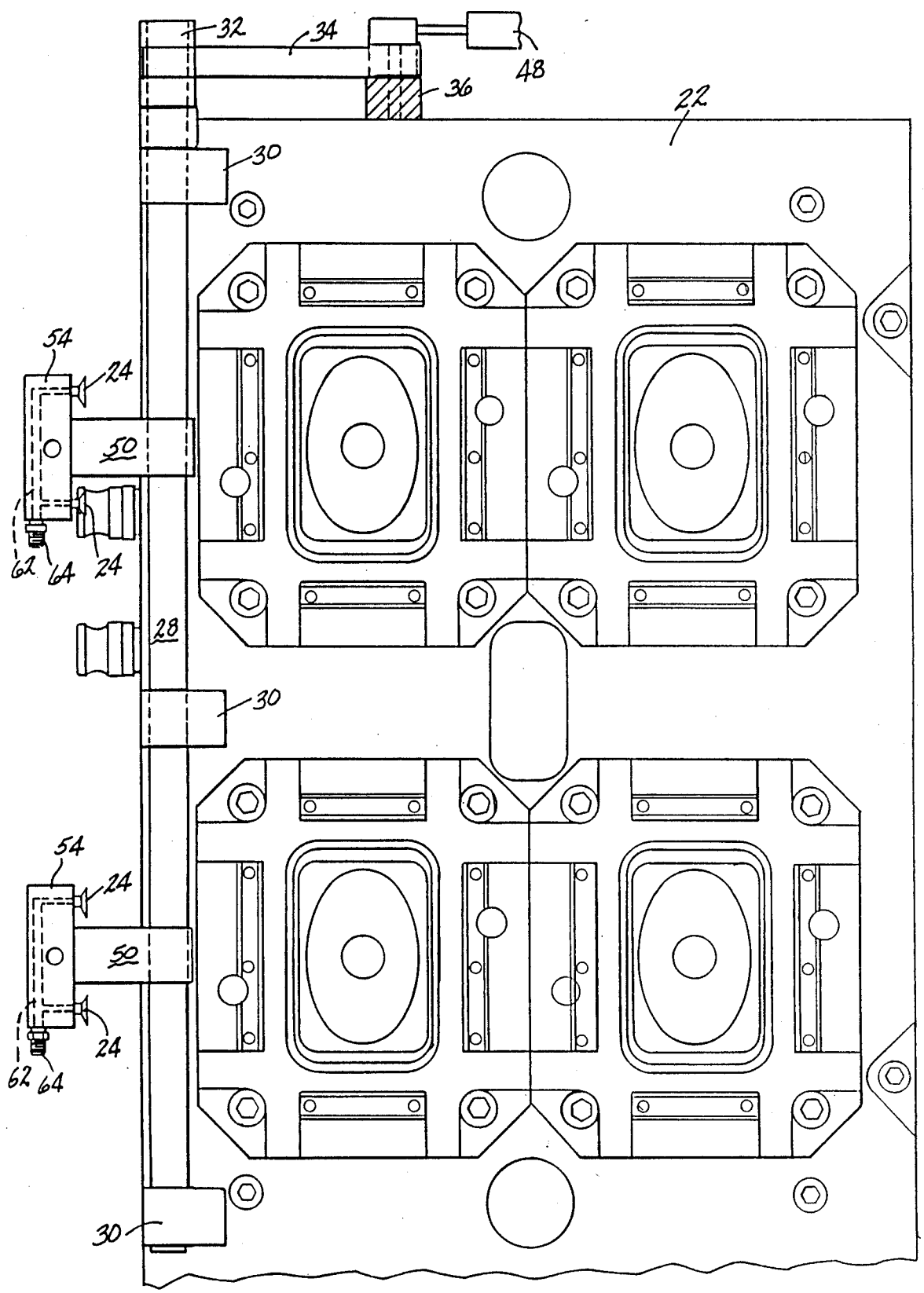
FIG. 6 is an end view of a mold core half and the workpiece removal device.
Figure 7:
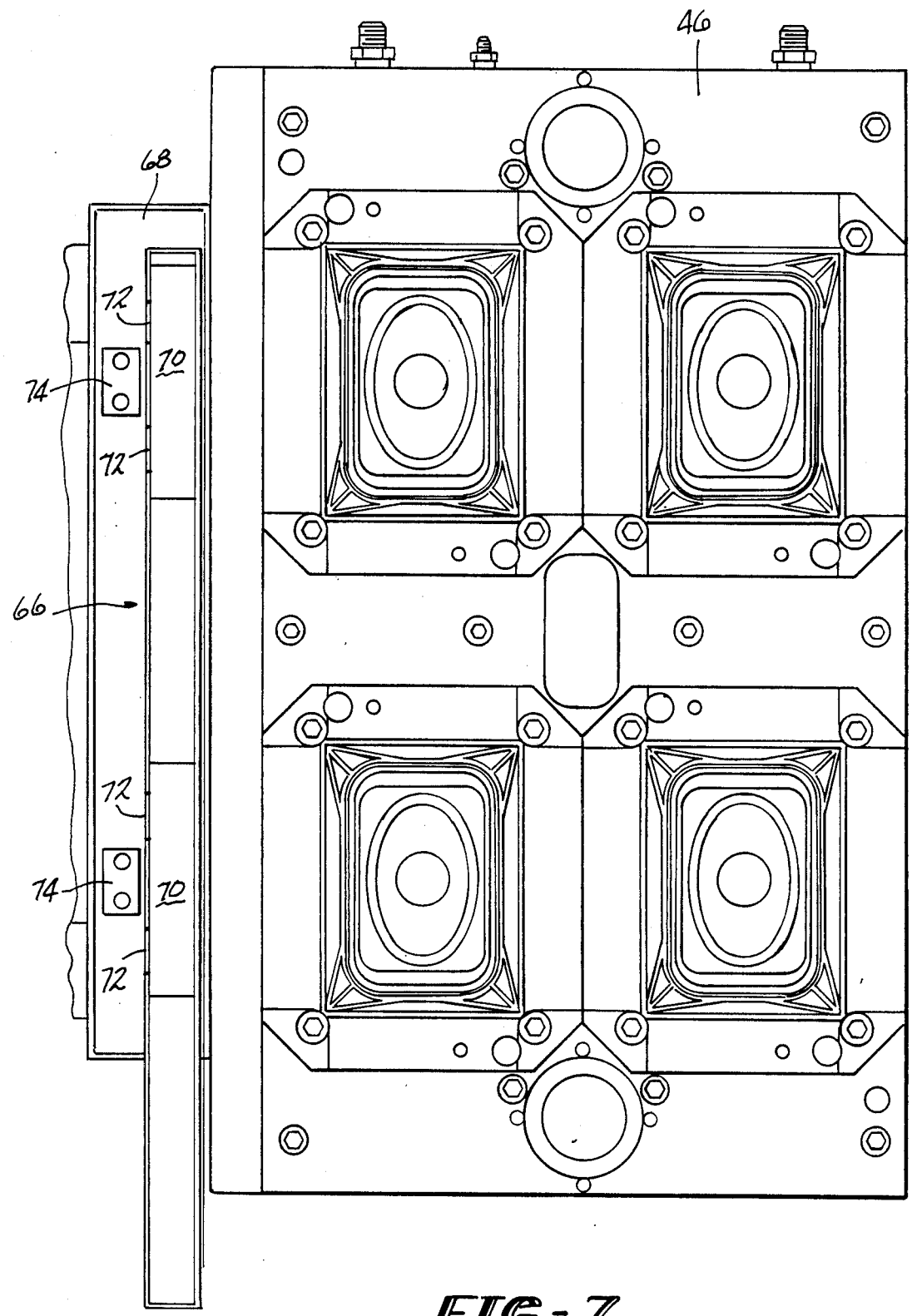

The mold core and cavity halves may form a single cavity for forming a single workpiece during a molding cycle or may have a multicavity configuration for forming multiple workpieces during each molding cycle. FIGS. 6 and 7 illustrate core and cavity halves for forming multiple workpieces in a single molding cycle. The workpieces formed during each molding cycle may have any desired shape or configuration.

Figure 3:
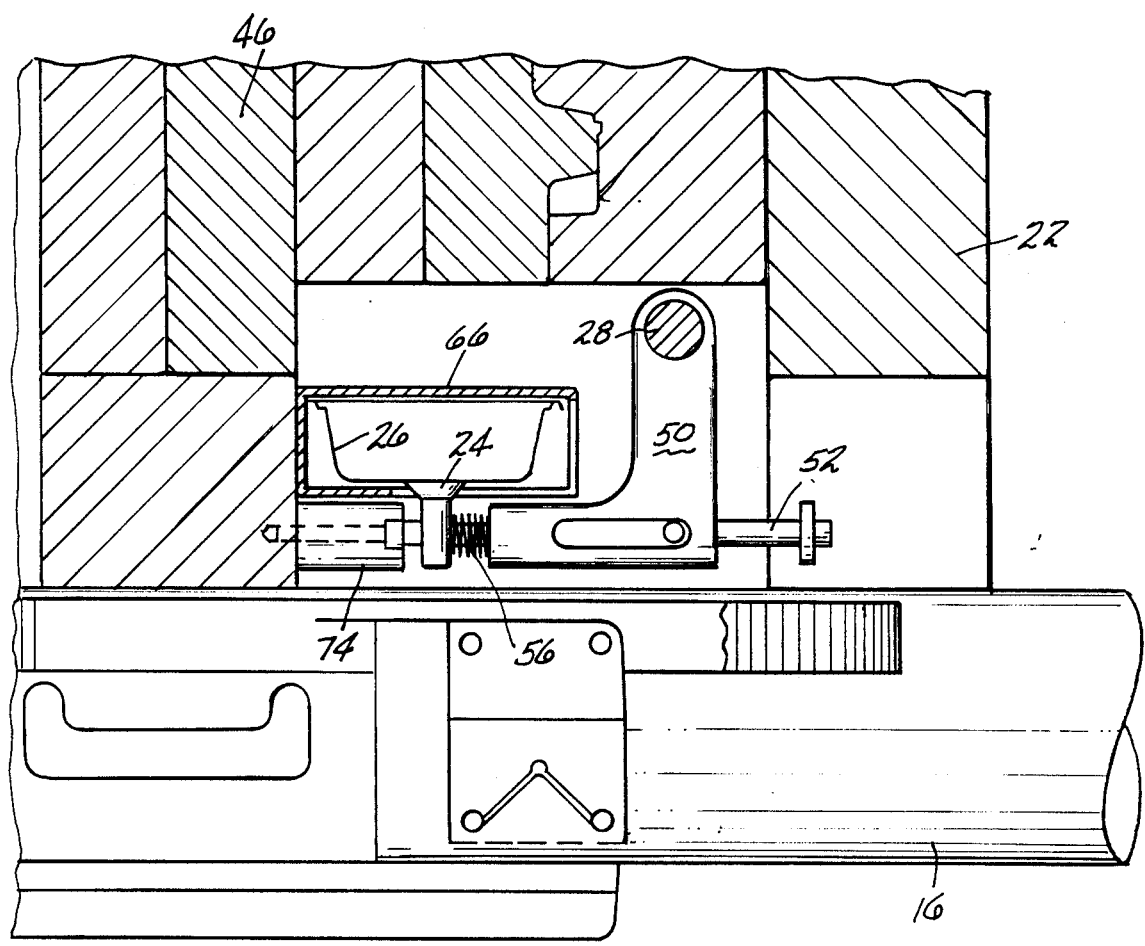
FIG. 3 is a plan view of the workpiece removal device with the mold in a closed position.
Figure 2:
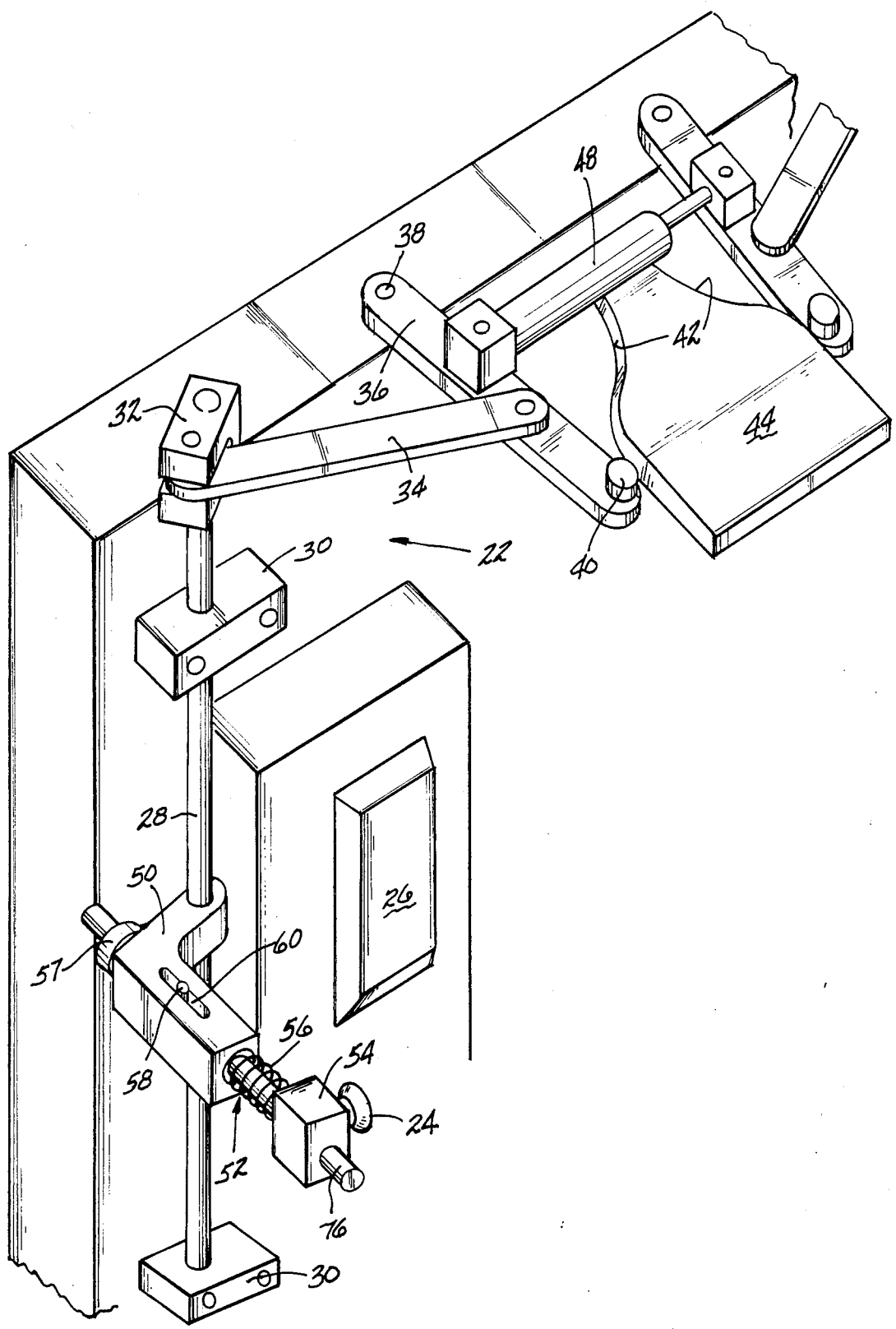
FIG. 2 is an isometric view of the workpiece removing device.
Figure 4:
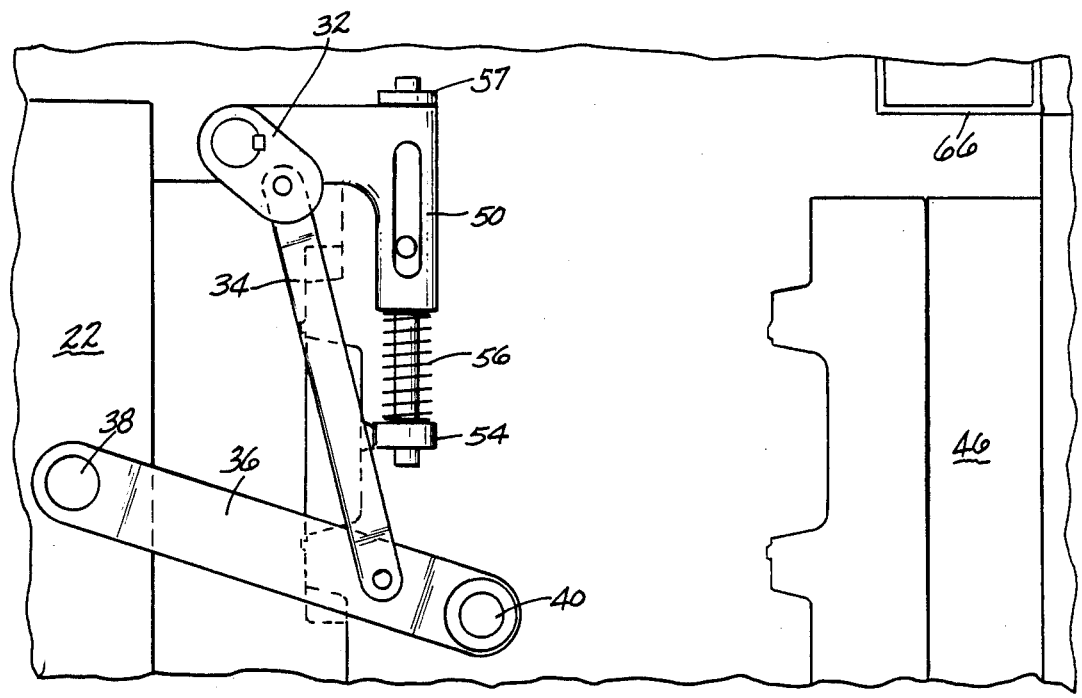
FIG. 4 is a plan view of the workpiece removal device with the mold in an open position.
Figure 5:
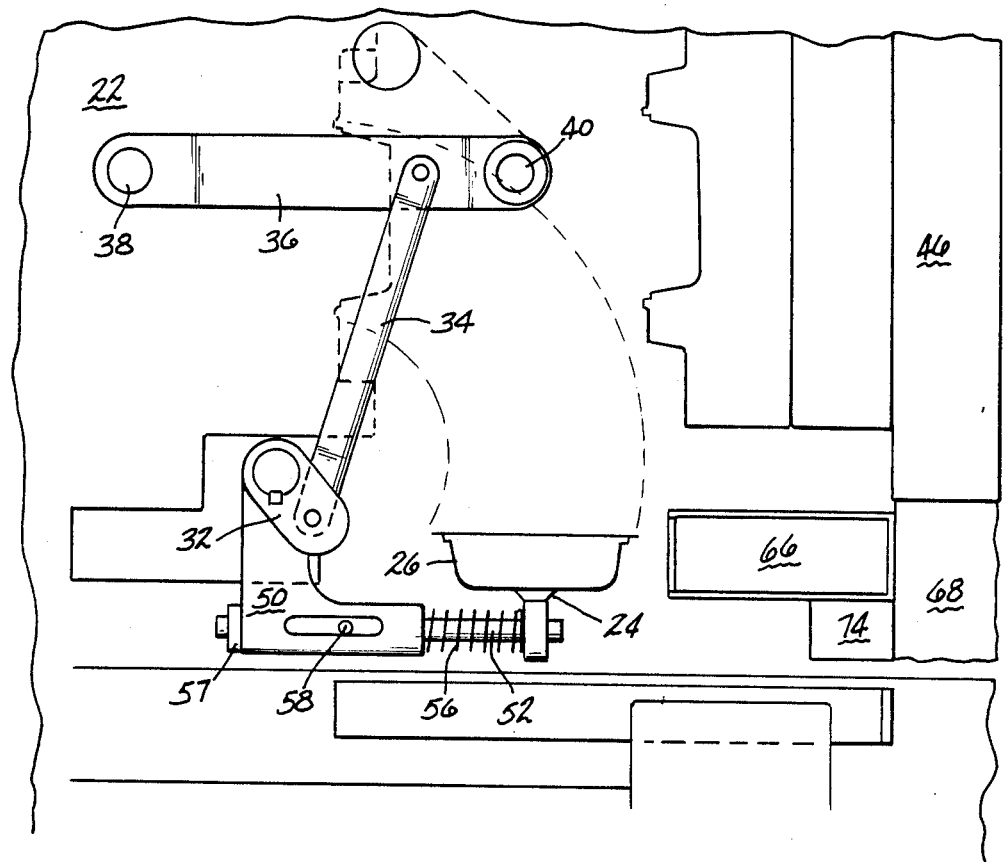
FIG. 5 is a plan view of a mold illustrating movement of the workpiece removal mechanism during the molding cycle.

FIG. 2 illustrates a mold core half 22 and the workpiece removal device 23 of the present invention. As shown in this figure, the workpiece removal device 23 includes a suction cup 24 for positively engaging and grasping a workpiece 26. During the molding cycle, the suction cup 24 is rotated in an approximately 90° arc from a retracted position outboard of the mold portions to a workpiece engaging position and then back to the retracted position as the mold portions move between open and closed positions. FIGS. 3–5 illustrate the various positions of the suction cup during a molding cycle. As the suction cup rotates back to its outboard position, it reliably holds and transports the workpiece to a position outboard of the mold portions.

The assembly for rotating the suction cup between the retracted and workpiece engaging positions is also illustrated in FIG. 2. The assembly consists of a pivoting shaft 28 rotatable about a substantially vertical axis. The shaft 28 is mounted to a side portion of the mold core half 22 by bearing blocks 30. The shaft 28 is actuated by a linkage assembly consisting of links 32, 34 and 36. Link 36 preferably pivots on a post 38 which is mounted to the top of mold core half 22. A cam roller 40 mounted on the end of link follows along the profiled surface 42 of a cam plate 44 rigidly fixed to the mold cavity half 46. The cam roller 40 is kept pressed against the cam plate 44 by a piston-cylinder arrangement 48. As the mold core half 22 moves relative to the mold cavity half 46, cam roller 40 moves along the profiled surface 42 thereby actuating shaft 28 and rotating suction cup 24 between its retracted and workpiece engaging positions.

As shown in FIG. 2, the suction cup 24 is situated on a rotatable arm assembly. The arm assembly comprises a bracket 50 keyed to the shaft 28, preferably at the centerline height of the workpiece 26 being fabricated, a translatable shaft 52 slidably mounted in the bracket 50, and an end block 54 mounted to the shaft end portion 76. The shaft 52 carries a key 58 travelling in a slot 60 in the bracket 50 so as to ensure the cup 24 is maintained in correct orientation for engaging the workpiece. The reasons for providing a translatable shaft 52 will be explained more fully hereinafter. The arm assembly further comprises a spring 56 positioned between one end of the bracket 50 and the end block 54 so as to maintain the end block 54 and the suction cup in an extended position and a stop 57 for adjusting the extension of the arm. The stop may engage the arm in any suitable manner known in the art such as threads.

The suction cup 24 may be mounted to the end block 54 in any desired manner. As shown in FIG. 6, more than one suction cup 24 may be mounted to the end block 54.

For multicavity molds, two or more arm assemblies may be mounted to the shaft 28 to effect simultaneous removal of multiple workpieces 26. FIG. 6 illustrates such an arrangement.

A vacuum may be used to assist in holding the workpiece 26 to the cup 24 as the cup moves from the workpiece engaging position to its outboard position. Any suitable means known in the art may be used to apply the vacuum. Preferably, each end block 54 has passageways 62 for applying the vacuum and a fitting 64 for connecting the passageways 62 to a vacuum source such as a vacuum pump. Suitable means (not shown) known in the art may be provided to switch off the vacuum as required. One of the advantages of the present invention is that the size of the vacuum is minimized because of the presence of the suction cup(s).

Duplicate devices for removing multiple workpieces 26 from a multicavity mold machine such as that shown in FIG. 6 may be provided on two opposed sides of the mold core half 22. A single cam plate 44 having two identically profiled surfaces 42 on opposed sides may be used to actuate the removal mechanisms in the manner discussed above. In such a system, a piston-cylinder device 48 may be used to keep both cam rollers 40 in contact with the profiled surfaces 42.

After the workpiece(s) 26 have been removed to the outboard position, they are transported to a material handling device not shown such as a receptacle or a conveyor belt via a drop chute 66 mounted to the molding machine. In a preferred embodiment, the drop chute 66 is mounted to a mold cavity plate extension block 68 so as to extend substantially vertically from the uppermost cavity to below the lower tiebars 18 of the machine. Such an arrangement is shown in FIG. 7.

Drop chute 66 has one or more openings 70 along one edge for receiving the workpiece(s) 26 on the end of suction cup(s) 24. One or more slots 72 are provided in a sidewall of chute to receive the cup(s) 24 holding the workpiece(s) 26.

As shown in FIG. 3, the workpiece(s) 26 enter the chute openings 70 during the mold closing portion of each molding cycle. The distance between the mold core half 22 to which the suction cup 24 is mounted and the extension block 68 to which the chute 66 is mounted decreases as the mold core half 22 moves from the mold open to the mold closed position. To accommodate the reduction in this distance, shaft 52 is slidably mounted in the bracket 50 as previously discussed. As the mold closes, the end 76 of the shaft contacts the stop block 74 mounted to extension block 68 causing the shaft 52 to slide relative to the bracket 50. When the mold core half 22 moves away from the extension block 68 as the mold opens, spring 56 causes the shaft 52 and the end block 54 to return to their extended position ready for the next workpiece pick-up.

As the workpiece 26 enters the chute 66, the vacuum is switched off. Numerous ways for switching off the vacuum are known in the art. For example, the vacuum may be shut off manually by an operator. Alternatively, the vacuum may be applied for a timed period only. Still further, a mold position sensor not shown may be used to close a vacuum control valve not shown. Switching off the vacuum allows the workpiece to free fall inside the chute 66 below the mold and into either a continuation of the chute or some other downstream material handling device not shown such as a receptacle or a conveyor belt.

Figure 8:
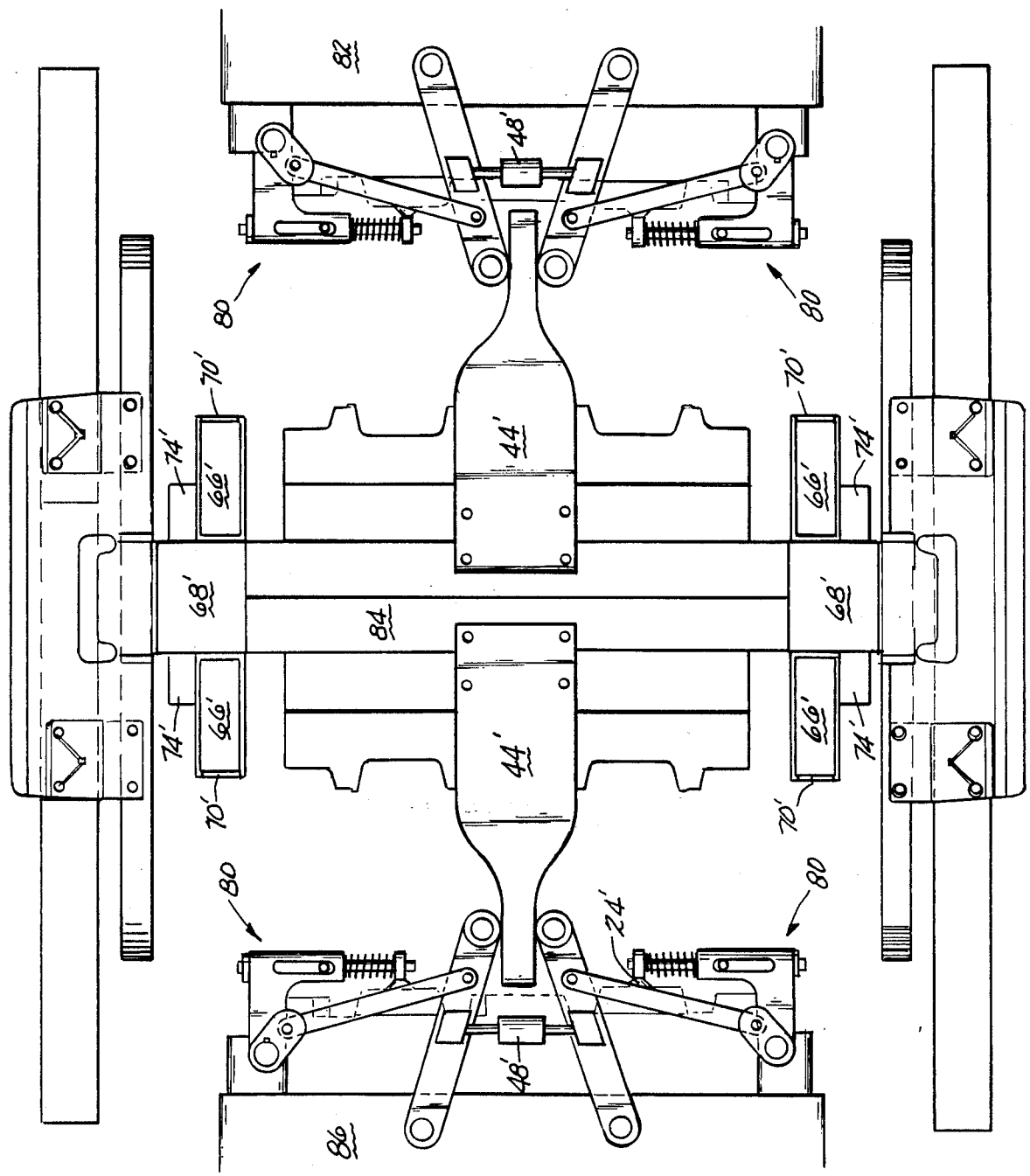
FIG. 8 is a plan view of a stack mold containing the workpiece removing mechanism of the present invention.

The workpiece removal mechanism of the present invention has been found to have particular utility in stack molding machine. FIG. 8 illustrates a stack molding machine containing the workpiece removal device of the present invention.

The stack mold machine includes a first mold portion 82 forming a first mold core half, a central mold portion 84 having two mold cavity halves on opposed surfaces, and a third mold portion 86 forming a second mold core half. The manner in which the mold portions move relative to each other is well known in the art and therefore will not be discussed in detail.

Each mold core half is provided with two workpiece removal devices 80, one adjacent each side portion of the mold core half. The workpiece removal assemblies each comprise the rotatable shaft suction cup and arm assembly discussed above.

The central mold portion 84 is provided on each side with a set of two drop chutes 66' and two stop blocks 74' mounted to a mold extension block 68'. A first of the drop chutes in each set has openings 70' facing the first mold portion 82. The other drop chute in each set has openings 70' facing the third mold portion 86.

The central mold portion 84 is also provided with two cam plates 44' for actuating the workpiece removal devices 80. As before, each suction cup 24' will swing from a retracted or outboard position to a workpiece engaging position intermediate the opening mold portions. As the mold portions are moved from an open position to a closed position, each suction cup 24' with the engaged workpiece will rotate through an approximately 90° arc to the outboard position. As the mold portions assume the closed position, the workpieces will enter the drop chutes. Any applied vacuum will then be shut off and the workpieces will dislodge from the suction cups and free fall down the chute to a material handling device such as a receptacle or a conveyor belt.

There are numerous advantages associated with the workpiece removal mechanism of the present invention. For example, by rotating the workpiece during its travel from the inboard position to the outboard position, the space between the machine tiebars and the mold core plate(s) can be minimized. This is because that space depends upon the height of the workpiece. In a guide chute arrangement where the part is translated from the inboard to the outboard position without such rotation, the space required is based on the workpiece's width—a problem in situations where the workpiece is relatively wide.

Furthermore, the simple linkage system used in the present invention for actuating the suction cup lends itself to standardization because only a few pieces have sizes dependent on the workpiece geometry and need to be specially made for each mold installation. This standardized approach considerably reduces the cost of such an assembly. It represents a significant advantage over the guide chute arrangement which require many custom made pieces for each installation.

The size of the vacuum means is also minimized with the workpiece removal device of the present invention because individual suction cups are used, one for each workpiece. A typical guide chute system uses a chute having several openings for a vacuum and thus requires a large pump to support the vacuum demand. The present invention provides a significant cost saving over such systems.

It is apparent that there has been provided in accordance with this invention a pivoting workpiece removal device which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A molding machine for producing molded articles, said machine comprising:
   first and second mold portions;

said second mold portion being movable relative to said first mold portion along a first axis between a mold open position and a mold closed position;

means for removing molded articles formed during a molding cycle from said machine;

said removing means comprising a first shaft assembly mounted to said first mold portion and an arm assembly rotatable between a first inboard position between said mold portions and a second outboard position substantially parallel to said first axis;

said first shaft assembly including a first shaft oriented substantially perpendicular to said first axis and rotatable about a second axis substantially perpendicular to said first axis;

said arm assembly including at least one suction cup for positively engaging and grasping a molded article to be removed; and cam means for causing rotation of said first shaft about said second axis and thereby rotation of said arm assembly between said first and second positions as said mold portions move between said mold open and mold closed positions, said cam means being actuated by relative movement between said mold portions.

2. A molding machine according to claim 1 wherein said arm assembly further includes:

a bracket mounted on said first shaft for pivotable movement between said first and second positions;

a second shaft assembly slidingly supported by said bracket for movement between an extended position when said arm assembly is in said first position and a retracted position when said arm assembly is in said second position; and a block mounted on an end of said second shaft assembly for supporting said at least one suction cup.

3. A molding machine according to claim 2 wherein said arm assembly further includes:

spring means for adjusting the extension of said second shaft assembly positioned between said bracket and said block.

4. A molding machine according to claim 1 wherein said cam means comprises:

a cam plate mounted to said second mold portion, said cam plate having at least one profiled surface;

a cam roller mounted to said first mold portion, said cam roller moving along said at least one profiled surface; and means for pressing said cam roller against said cam surface.

5. A molding machine according to claim 4 wherein said removing means further comprises:

a linkage assembly between said cam means and said first shaft assembly including at least one link pivotably mounted to said first mold portion.

6. A molding machine according to claim 1 further comprising:

a chute mounted to said second mold portion in a fixed location for transporting removed articles to a material receiving device.

7. A molding machine according to claim 6 further comprising:

said chute having an opening for receiving a molded article affixed to said arm assembly; and said arm assembly in said second position being aligned with said opening in said chute so as to permit insertion of said article into said chute as said mold portions move to said closed position.

8. A molding machine according to claim 3 further comprising:

stop means for contacting said swing arm assembly and for causing retraction of said second shaft assembly mounted to said second mold portion.

9. A molding machine according to claim 1 further comprising vacuum means for holding said molded article on said at least one suction cup during travel from said first inboard position to said second outboard position.

10. A molding machine according to claim 9 further comprising:

a chute for receiving said molded article; and means for automatically switching off said vacuum applying means after said molded article has entered said chute.

11. A molding machine according to claim 1 further comprising:

two upper rails and two lower rails upon which at least one of said mold portions slides;

said upper rails and said lower rails defining two vertical planes; and said swing arm assembly in said outboard position being located intermediate said two planes.

12. A molding machine according to claim 1 wherein said arm assembly rotates through an approximate 90° arc between said first and second position.

13. A molding machine for forming molded plastic articles which comprises:

first and second mold portions;

said second mold portion being movable relative to said first mold portion;

a chute for transporting said molded articles to a material receiving device;

said chute being mounted to a first one of said mold portions in a fixed position and having an opening for receiving a molded article;

means for grasping and removing a molded article from between said mold portions; and said grasping and removing means moving said molded article from a first position intermediate said mold portions to a second outboard position aligned with said opening.

14. A molding machine for forming a plurality of molded plastic articles during a molding cycle which comprises:

first and second mold portions;

said second mold portion being movable relative to said first mold portion along a first axis;

at least one of said mold portions having a plurality of mold cavities and the other of said portions having a plurality of mold cores for forming said molded articles;

means for removing said molded articles as said mold portions move between a mold open position and a mold closed position;

said removing means comprising two shafts rotatably mounted to said first mold portion, each shaft being positioned adjacent an edge of said first mold portion and being oriented substantially perpendicular to said first axis; and said removing means further comprising at least one rotatable arm assembly mounted to each said shaft with the at least one rotatable arm assembly mounted to a first of said shafts rotating in a clockwise direction as said molds move between said open and closed positions and the at least one rotatable arm assembly mounted to a second of said shafts rotating in a counterclockwise direction as said molds move between said open and closed positions.

15. The molding machine of claim 14 further comprising: cam means for causing said rotation of said arm assemblies; said cam means including a cam plate mounted to said second mold portion having two camming surfaces and two cam rollers mounted to said first mold portion; and each said roller being joined to a respective one of said shafts by a linkage assembly, whereby movement of said molds between said open and closed positions causes movement of said rollers along said camming surfaces and thereby rotation of said shafts and said arm assemblies.

16. The molding machine of claim 14 wherein said removing means comprises at least one suction cup mounted to each said rotatable arm assembly for grasping one of said molded articles.

17. The molding machine of claim 14 wherein said moving means comprises two arm assemblies mounted to each said shaft.

18. The molding machine of claim 14 further comprising:

a third mold portion movable relative to said first and second mold portions along said first axis;

said third mold portion forming with said second mold portion a mold for producing a plurality of molded articles; and said third mold portion having two shafts substantially perpendicular to said first axis rotatably mounted thereon and at least one rotatable arm assembly mounted to each said shaft.

* * * * *